United States Patent
Oh (10) Patent No.: US 7,382,089 B2
(45) Date of Patent: Jun. 3, 2008

(54) FIELD EMISSION DISPLAY HAVING DAMAGE PREVENTION ANODE INPUT TERMINAL LAYERS

(75) Inventor: Tae-Sik Oh, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 317 days.

(21) Appl. No.: 10/731,385

(22) Filed: Dec. 9, 2003

(65) Prior Publication Data

US 2004/0222734 A1 Nov. 11, 2004

(30) Foreign Application Priority Data

May 6, 2003 (KR) .................. 10-2003-0028604

(51) Int. Cl.
*H01J 63/04* (2006.01)
*H01J 1/62* (2006.01)

(52) U.S. Cl. .................. 313/496; 313/466; 313/495; 313/497; 313/474

(58) Field of Classification Search ............ 313/495, 313/496
See application file for complete search history.

(56) References Cited

U.S. PATENT DOCUMENTS

| | | | | |
|---|---|---|---|---|
| 4,472,658 A | * | 9/1984 | Morimoto et al. | 313/497 |
| 5,726,530 A | * | 3/1998 | Peng | 313/495 |
| 5,955,832 A | * | 9/1999 | Tomita et al. | 313/495 |
| 5,965,978 A | * | 10/1999 | Kishino et al. | 313/496 |
| 5,973,452 A | * | 10/1999 | Bojkov et al. | 313/495 |
| 5,986,398 A | | 11/1999 | Makino | |
| 6,037,711 A | * | 3/2000 | Cathey et al. | 313/497 |
| 6,410,101 B1 | * | 6/2002 | Jaskie et al. | 427/524 |
| 6,633,119 B1 | * | 10/2003 | Chalamala et al. | 313/495 |
| 6,717,340 B2 | * | 4/2004 | Nishimura | 313/310 |
| 6,900,066 B2 | * | 5/2005 | Toyota et al. | 438/20 |
| 2004/0108515 A1 | * | 6/2004 | Muroyama et al. | 257/144 |

* cited by examiner

*Primary Examiner*—Sikha Roy
(74) *Attorney, Agent, or Firm*—Christie, Parker & Hale, LLP (57) ABSTRACT

A field emission display (FED). A vacuum assembly is formed with first and second substrates and a sealant. An electron emission assembly is formed on the first substrate and emits electrons by the formation of electric fields. An illumination assembly is formed on the second substrate and realizes a display of images by electrons emitted from the electron emission assembly. The illumination assembly includes a transparent conductive layer formed on the second substrate and having an anode input terminal that extends outside the vacuum assembly and to which an anode voltage is applied, a phosphor screen formed on the transparent conductive layer, and a metal layer formed on the phosphor screen within the vacuum assembly in such a manner that a portion of the metal layer contacts the transparent conductive layer.

21 Claims, 7 Drawing Sheets

FIELD EMISSION DISPLAY HAVING DAMAGE PREVENTION ANODE INPUT TERMINAL LAYERS

CROSS-REFERENCE TO RELATED APPLICATIONS

This application claims priority to and the benefit of Korean Patent Application No. 2003-0028604 filed on May 6, 2003 in the Korean Intellectual Property Office, the entire content of which is incorporated herein by reference.

BACKGROUND OF THE INVENTION (a) Field of the Invention

The present invention relates to a field emission display, and more particularly, to a field emission display that includes a thin metal layer formed on a phosphor screen, which is provided on a faceplate, to improve brightness and contrast.

(b) Description of the Related Art

In a conventional field emission display (FED), there are formed on a backplate emitters that are electron emission sources, and electrodes (i.e., cathode electrodes and gate electrodes) that operate such that electrons are emitted from the emitters. A phosphor screen is formed on a surface of a faceplate opposing the backplate.

With this configuration, a difference in potential between the cathode electrodes and the gate electrodes is used to effect the emission of electrons from the emitters. The emitted electrons strike the phosphor screen to illuminate phosphors thereof, thereby realizing the display of predetermined images.

In order to attract the electrons emitted from the emitters toward the phosphor screen, a high potential state of the surface of the faceplate on which the phosphor screen is formed must be maintained. To realize this in the conventional FED, a transparent conductive layer (typically, an ITO layer) is formed between the faceplate and the phosphor screen, and an anode voltage of a few hundred to a few thousand volts is applied to the transparent conductive layer.

There have been efforts to improve screen brightness and contrast by adding to the above basic structure a thin metal layer (generally an aluminum layer), which is formed on the phosphor screen. U.S. Pat. No. 5,986,398 discloses an FED using such a structure.

With the formation of a thin metal layer on the phosphor screen, in addition to improvements in screen brightness and contrast resulting from a metal black of the metal layer, the anode voltage may be directly applied to the metal layer and the transparent conductive layer need not be included in the structure. As a result, a greater brightness may be realized since a higher anode voltage may be applied to the metal layer than to the transparent conductive layer.

Figure 7:
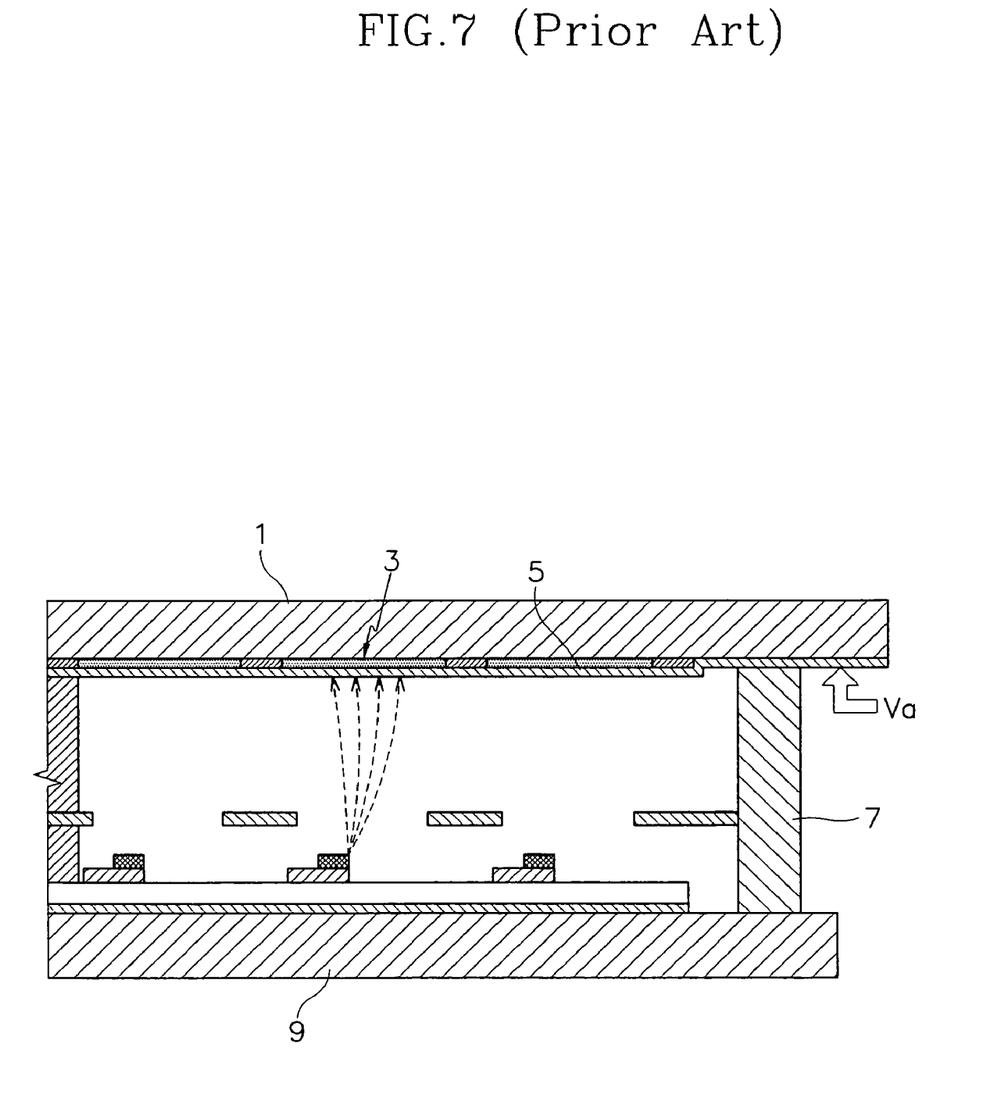
FIG. 7 is a partial sectional view of a conventional FED.

FIG. 7 is a partial sectional view of a conventional FED. Phosphor screen 3 and metal layer 5 are formed on one side of faceplate 1. Anode voltage Va is applied to metal layer 5 during operation. Metal layer 5 extends past sealant 7 for connection to an external circuit (not shown). Sealant 7 is positioned on metal layer 5 and seals faceplate 1 and backplate 9.

However, there are problems associated with metal layer 5, and in particular, with metal layer 5 made of aluminum. That is, although an adhesive strength of metal layer 5 is exceptional immediately following a layer forming process such as sputtering, if thermal deformation occurs as a result of a baking process following sputtering, the adhesivity of metal layer 5 is significantly reduced. Accordingly, metal layer 5 having undergone a baking process is easily separated from faceplate 1 such that it is unable to perform its function. This makes metal layer 5 unsuitable for use as a terminal that receives the anode voltage.

Further, the strength of metal layer 5 is reduced for the above reasons such that metal layer 5 is damaged in the vicinity of sealant 7. This reduces the degree of vacuum in the FED, negatively affecting the overall operation of the display.

SUMMARY OF THE INVENTION

In one exemplary embodiment of the present invention, there is provided a FED that prevents a reduction in strength of a thin metal layer such that the metal layer may be used as an anode electrode while its ability to be used for its original intended purpose is maintained, and such that damage to the metal layer in the vicinity of a sealant does not occur to thereby prevent a reduction in the level of the vacuum in the display.

In an exemplary embodiment of the present invention, there is provided a FED, which includes a first substrate and a second substrate opposing one another with a predetermined gap therebetween, which are sealed using a sealant in a state where a vacuum is formed between the first and second substrates to thereby form a vacuum assembly. An electron emission assembly is formed on the first substrate and emits electrons by the formation of electric fields. An illumination assembly is formed on the second substrate and realizes a display of images by electrons emitted from the electron emission assembly. The illumination assembly includes (a) a transparent conductive layer formed on a surface of the second substrate, and having an anode input terminal that extends outside the vacuum assembly and to which an anode voltage is applied, (b) a phosphor screen formed on the transparent conductive layer, and (c) a metal layer formed on the phosphor screen within the vacuum assembly in such a manner that a portion of the metal layer contacts the transparent conductive layer to be electrically connected to the same.

The transparent conductive layer and the anode input terminal may be integrally formed, and are made, for example, of films of indium tin oxide. Further, the metal layer is formed over the phosphor screen having an area larger than the phosphor screen such that edges of the metal layer contact the transparent conductive layer.

In another exemplary embodiment, a FED includes a first substrate and a second substrate opposing one another with a predetermined gap therebetween, which are sealed using a sealant in a state where a vacuum is formed between the first and second substrates to thereby form a vacuum assembly. An electron emission assembly is formed on the first substrate and emits electrons by the formation of electric fields. An illumination assembly is formed on the second substrate and realizes the display of images by electrons emitted from the electron emission assembly. The illumination assembly includes a phosphor screen formed on a surface of the second substrate, a metal layer formed on the phosphor screen within the vacuum assembly, and an anode input terminal formed extending from within the vacuum assembly to outside of the same, in which an end within the vacuum assembly contacts the metal layer to be electrically connected to the metal layer.

The anode input terminal is a thin film made from indium tin oxide, Ni, or Cr. The metal layer covers the entire phosphor screen and a portion of the anode input terminal.

For both of the above two embodiments, the electron emission assembly includes electron emission sources and electrodes for inducing the emission of electrons from the electron emission sources. The electrodes include cathode electrodes and gate electrodes, which are insulated from each other by an insulation layer and are formed in a stripe pattern in such a manner that the cathode electrodes are substantially perpendicular to the gate electrodes.

The electron emission sources are made of a carbon-based material such as carbon nanotubes, graphite, diamond, diamond-like carbon, $C_{60}$ (Fullerene), or a combination of these materials.

The field emission display further includes a grid electrode mounted between the first substrate and the second substrate. Lower spacers are mounted between the first substrate and the grid electrode in non-pixel regions, and upper spacers are mounted between the second substrate and the grid electrode in non-pixel regions.

DETAILED DESCRIPTION

Referring to FIGS. 1-4, the FED includes backplate 2 and faceplate 4. Backplate 2 and faceplate 4 are provided opposing one another with a predetermined gap therebetween. An electron emission assembly for emitting electrons through the formation of an electric field is formed on backplate 2. An illumination assembly for realizing predetermined images by interaction with electrons is formed on faceplate 4.

In more detail, with respect to the electron emission assembly, gate electrodes 6 are formed on a surface of backplate 2 opposing faceplate 4. Gate electrodes 6 are formed in a stripe pattern and along one direction of backplate 2 (for example, direction Y). Further, insulation layer 8 is formed over an entire surface of backplate 2 covering gate electrodes 6, and cathode electrodes 10 are formed on insulation layer 8. Cathode electrodes 10 are formed in a stripe pattern and in a direction substantially perpendicular to the direction of gate electrodes 6, that is, cathode electrodes 10 are formed along direction X.

In this embodiment, with pixel regions of the FED being defined by areas at which gate electrodes 6 and cathode electrodes 10 intersect, emitters 12, which are electron emission sources, are positioned along one long edge of each of the cathode electrodes 10 at areas corresponding to each of the pixel regions.

Further, a plurality of counter electrodes 14 is formed on insulation layer 8 at areas adjacent to emitters 12. That is, one of the counter electrodes 14 is positioned at a predetermined distance from each of the emitters 12 on insulation layer 8. Counter electrodes 14 attract electric fields of gate electrodes 6 toward an upper surface of insulation layer 8. Counter electrodes 14 contact gate electrodes 6 (to be electrically connected to the same) by also being formed into via openings 8a, which are formed in insulation layer 8.

As a result, when a predetermined drive voltage is applied to gate electrodes 6 to generate electric fields for the emission of electrons between gate electrodes 6 and emitters 12, counter electrodes 14 act to attract the voltage of gate electrodes 6 to peripheries of emitters 12 such that more intense electric fields are applied to emitters 12. This acts to improve the emission of electrons from emitters 12.

In accordance with the present invention, emitters 12 are realized using a carbon-based material such as carbon nanotubes, graphite, diamond, diamond-like carbon (DLC), $C_{60}$ (Fullerene), or a combination of these materials. In this embodiment, carbon nanotubes are used for emitters 12.

Formed on a surface of faceplate 4 opposing backplate 2 are transparent conductive layer (e.g., an ITO layer) 16 and a phosphor screen 19. Phosphor screen 19 includes R, G, and B phosphor layers 18 formed at predetermined intervals along one direction of faceplate 4, for example, along the direction of gate electrodes 6 (direction Y). Phosphor screen 19 also includes black matrix 20 formed between each of the R, G, and B phosphor layers 18 to improve contrast.

Thin metal layer 22 made of, for example, aluminum is formed on phosphor screen 19. Metal layer 22 improves screen brightness and contrast by providing a metal black effect, and acts to improve withstand voltage characteristics of the FED.

Faceplate 4 and backplate 2 are sealed with the predetermined gap therebetween using sealant 24 and with cathode electrodes 10 and phosphor layers 18 substantially perpendicular. A vacuum is formed in the gap between faceplate 4 and backplate 2 before fully sealing the same to thereby complete the formation of the FED. A vacuum assembly is therefore formed by faceplate 4, backplate 2, and the area encompassed by sealant 24 inside which the vacuum is formed.

The FED of this embodiment has a detailed structure such that transparent conductive layer 16 and metal layer 22 are formed on the surface of faceplate 4 on which phosphor screen 19 is formed, high anode voltage Va is stably applied to these elements, metal layer 22 is securely attached, and the vacuum state of the FED is fully maintained.

In more detail, in this embodiment, transparent conductive layer 16 is extended such that a portion of the same of a predetermined length is positioned outside sealant 24, that is, positioned outside the vacuum formed between faceplate 4 and backplate 2. This portion of transparent conductive layer 16 forms anode input terminal 26. Metal layer 22 is formed fully within the area of the vacuum between faceplate 4 and backplate 2. However, part of metal layer 22 contacts transparent conductive layer 16 to be electrically connected to the same.

Anode input terminal 26 extended from transparent conductive layer 16 is connected to an external circuit (not shown) to receive high anode voltage Va. Anode voltage Va is transmitted to transparent conductive layer 16 and metal layer 22 through anode input terminal 26.

When forming metal layer 22 on phosphor screen 19 using a method such as sputtering, metal layer 22 is formed having a larger area than phosphor screen 19 so that edges of metal layer 22 extend past phosphor screen 19 and contact transparent conductive layer 16. Metal layer 22 is electrically connected to transparent conductive layer 16 so that anode voltage Va applied to anode input terminal 26 is jointly used by these elements.

With the structure of faceplate 4 as described above, sealant 24 seals faceplate 4 and backplate 2 in a state where it is positioned not on metal layer 22 but on anode input terminal 26. Since the strength of adhesion of transparent conductive layer 16 and anode input terminal 26 to faceplate 4 is significantly greater than with the conventional metal layer, anode input terminal 26 does not become damaged in the vicinity of sealant 24 during assembly. This prevents a reduction in the vacuum state of the FED and enables anode voltage Va to be stably maintained after application of the same.

In addition, since metal layer 22 is formed only in the area of the FED encompassed by sealant 24 (i.e., in the area of the FED where the vacuum is formed), even if metal layer 22 undergoes a reduction in adhesivity as a result of becoming thermally deformed by baking, external shock that damages metal layer 22 may be prevented from reaching this element. As a result, a good level of adhesivity of metal layer 22 may be maintained such that the same is prevented from being detached from phosphor screen 19.

Figure 2:
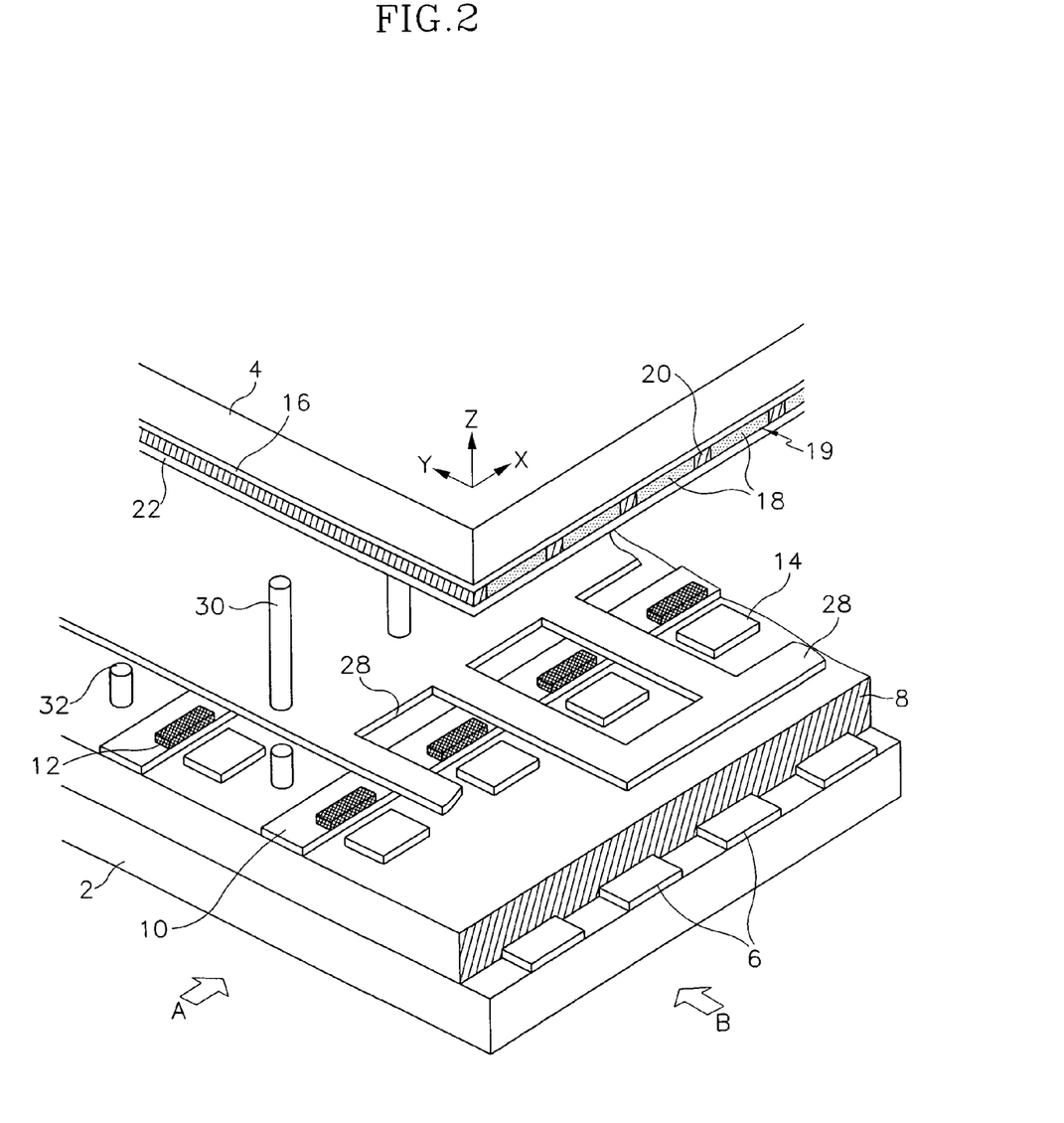
FIG. 2 is a partial exploded perspective view of the FED of FIG. 1.
Figure 3:
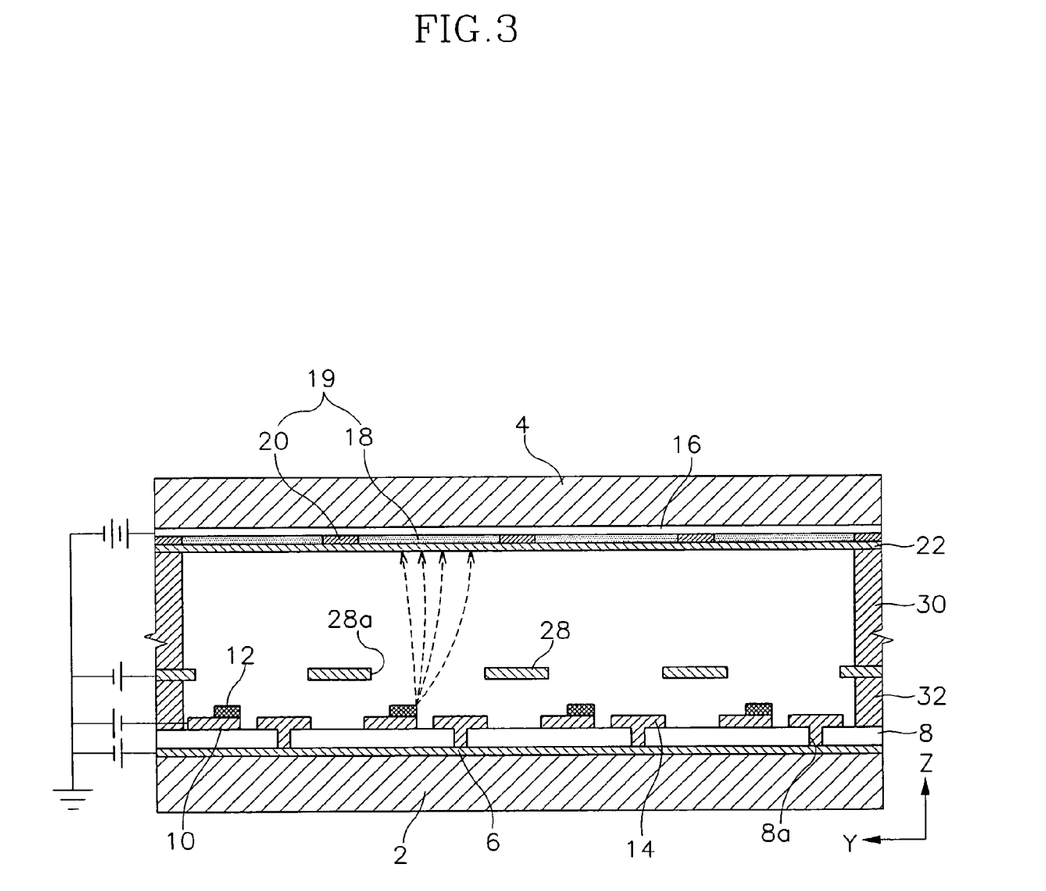
FIGS. 3 and 4 are partial sectional views of the FED of FIG. 1, as viewed from direction A and direction B of FIG. 2 and in a state where the FED is assembled.
Figure 4:
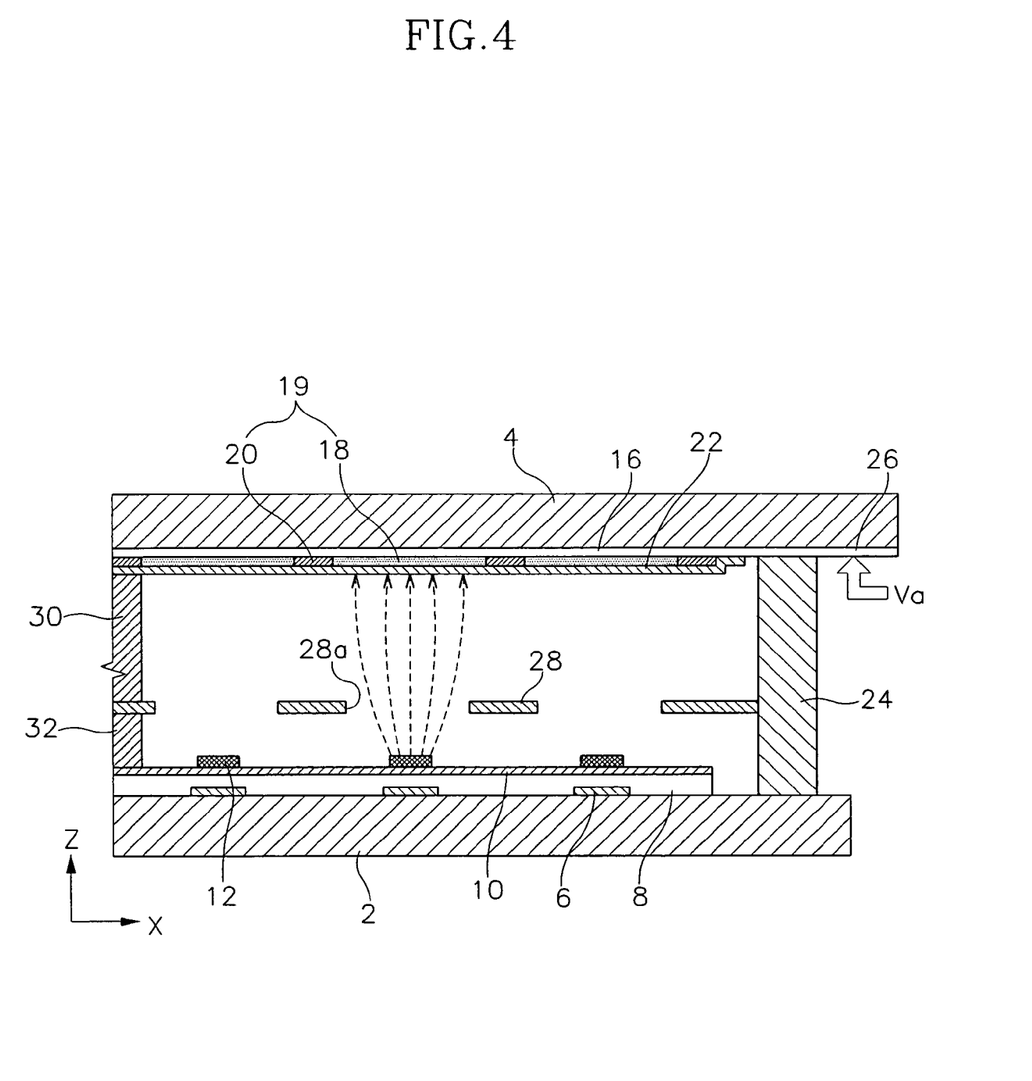

Added to the above structure is mesh grid electrode 28 that has a plurality of apertures 28a and is positioned between faceplate 4 and backplate 2 in the area between the same where the vacuum is formed. Grid electrode 28 focuses the electrons emitted from emitter 12, and acts also to prevent damage to backplate 2 in the event arcing occurs within the FED.

A plurality of upper spacers 30 is mounted in non-pixel regions between faceplate 4 and grid electrode 28 to maintain a uniform gap between these elements, and a plurality of lower spacers 32 is mounted between backplate 2 and grid electrode 28 to maintain a uniform gap between these elements.

Figure 1:
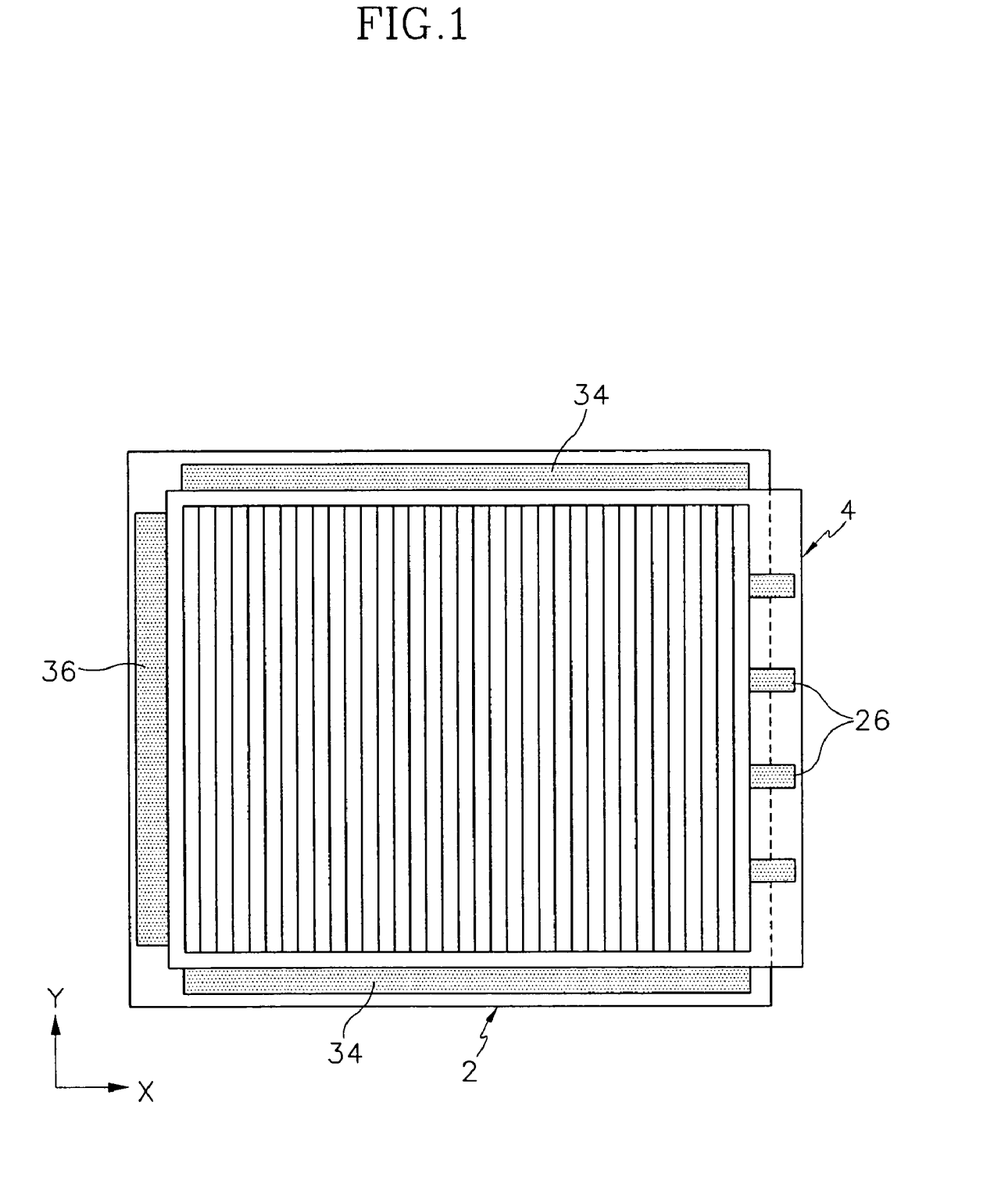
FIG. 1 is a plan view of a FED according to an exemplary embodiment of the present invention.

In FIG. 1, reference numeral 34 indicates gate input pads that apply a drive voltage to gate electrodes 6, and reference numeral 36 indicates a cathode input pad that applies a drive voltage to cathode electrodes 10.

In the FED configured as described above, predetermined external voltages are applied to gate electrodes 6, cathode electrodes 10, transparent conductive layer 16, and grid electrode 28. For example, a positive voltage of a few to a few tens of volts is applied to gate electrodes 6, a negative voltage of a few to a few tens of volts is applied to cathode electrodes 10, a positive voltage of a few hundred to a few thousand volts is applied to transparent conductive layer 16, and a positive voltage of a few tens of to a few hundred volts is applied to grid electrode 28.

Therefore, electric fields are formed in the peripheries of emitters 12 by the difference in voltage between gate electrodes 6 and cathode electrodes 10 such that electrons are emitted from emitters 12. The emitted electrons are attracted by the positive voltage applied to grid electrode 28 to pass through apertures 28a thereof and be directed toward faceplate 4. After passing through apertures 28a of grid electrode 28, the electrons are attracted to transparent conductive layer 16 and metal layer 22 by the positive voltages applied to these elements. The electrons, therefore, strike phosphor layers 18 to illuminate the same. This operation is performed in a selective manner to realize predetermined images.

Figure 5:
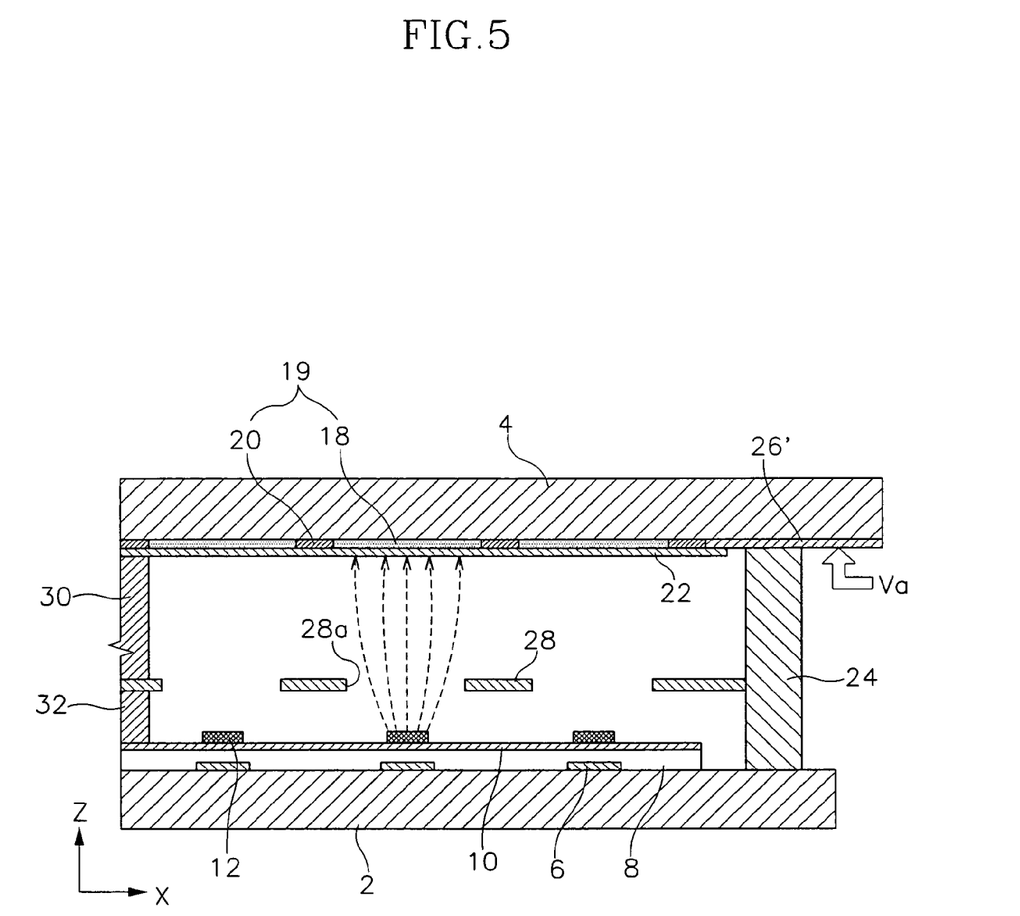
FIG. 5 is a partial sectional view of a FED according to another exemplary embodiment of the present invention.

FIG. 5 is a partial sectional view of a FED according to another exemplary embodiment of the present invention. The structure of backplate 2 and of grid electrode 28 is identical to the structure used for the above embodiment, and only the structure of faceplate 4 is varied. Therefore, only aspects of faceplate 4 different from the above embodiment will be described in the following.

As shown in the drawing, in this embodiment, phosphor screen 19 that includes R, G, and B phosphor layers 18 and black matrix 20 is directly formed on the surface of faceplate 4 opposing backplate 2. Further, metal layer 22 is formed on phosphor screen 19 in the area encompassed by sealant 24 where the vacuum is formed. Anode input terminal 26' contacts metal layer 22 on one end and extends a predetermined length to outside the area encompassed by sealant 24. Anode voltage Va is applied to metal layer 22 through anode input terminal 26'.

Anode input terminal 26' may be made of an ITO film, which has a high adhesivity with respect to faceplate 4, or may be realized using a metal film made of Ni or Cr, for example, that does not lose adhesivity even after baking.

Metal layer 22 and the anode input terminal 26' may be formed using the following procedure. Anode input terminal 26' is formed by coating an ITO film, Ni film, or a Cr film, then mounting the coated film such that it is aligned with phosphor screen 19. When performing aluminum sputtering on phosphor screen 19 to form metal layer 22, edge portions of metal layer 22 are formed contacting anode input terminal 26'.

With this structure, sealant 24 seals faceplate 4 and backplate 2 in a state where it is positioned not on metal layer 22 but on anode input terminal 26'. Therefore, in this embodiment, anode input terminal 26' does not become damaged in the vicinity of sealant 24 during assembly. This prevents a reduction in the vacuum state of the FED and enables anode voltage Va to be stably maintained after application of the same.

Figure 6:
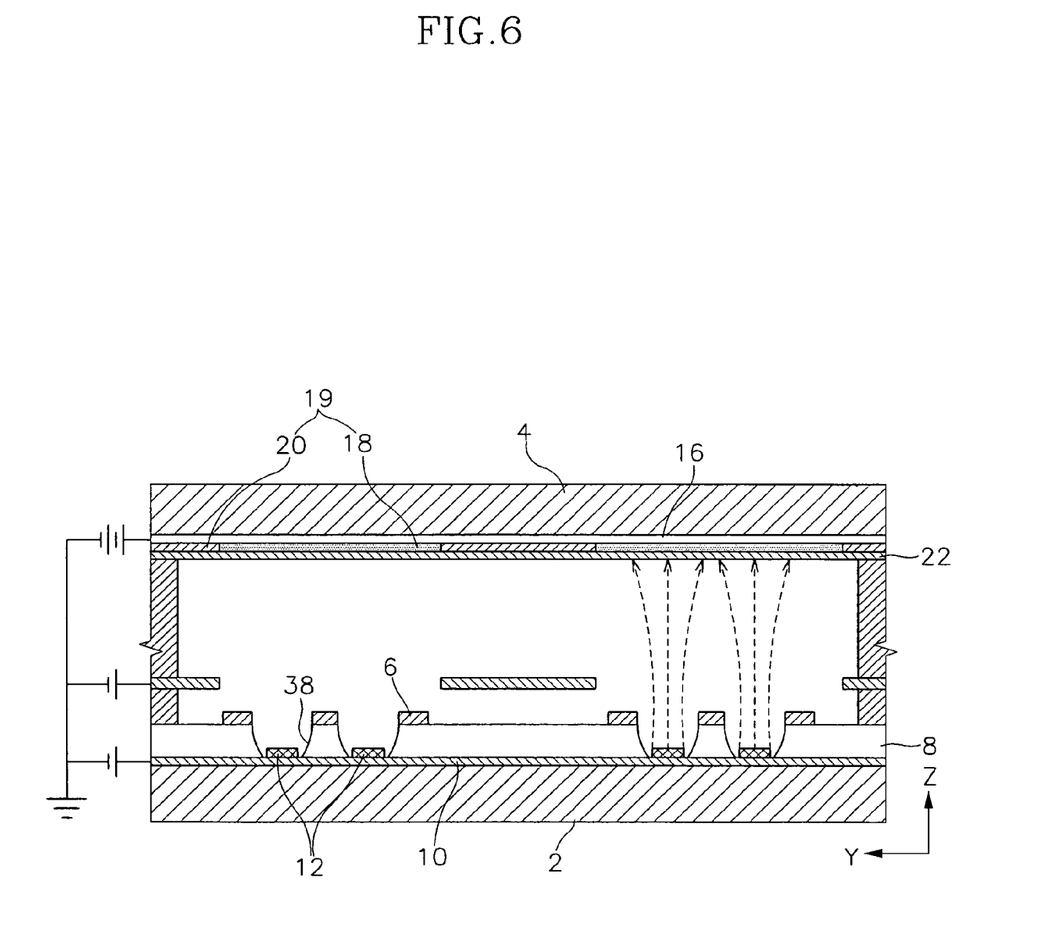
FIG. 6 is a partial sectional view of a FED according to yet another exemplary embodiment of the present invention.

An electron emission assembly to realize the emission of electrons from the emitters 12 may be realized using an alternative configuration as shown in FIG. 6.

In more detail, cathode electrodes 10 are formed on a surface of backplate 2 opposing faceplate 4. Cathode electrodes 10 are formed in a stripe pattern and along one direction of backplate 2 (for example, direction Y). Further, insulation layer 8 is formed over an entire surface of backplate 2 covering cathode electrodes 10, and gate electrodes 6 are formed on insulation layer 8 in a stripe pattern and along a direction substantially perpendicular to cathode electrodes 10 (i.e., along direction X).

Openings 38 that pass through gate electrodes 6 and insulation layer 8 are formed at areas where cathode electrodes 10 and gate electrodes 6 intersect to thereby expose cathode electrodes 10. Electron emission sources, that is, emitters 12 are formed in openings 38 on exposed cathode electrodes 10.

The processes involved in the emission of electrons from emitters 12 and the landing of the electrons on phosphor screen 19 to realize the display of images are substantially identical to those involved in the above embodiments. A detailed description will therefore not be provided.

In the FED of the present invention structured and operating as described above, layers functioning as the anode input terminal do not become damaged in the vicinity of the sealant. As a result, a high vacuum state of the FED may be maintained. Also, the adhesivity of the metal layer with respect to the phosphor screen is improved such that the high anode voltage may be stably maintained, and damage to the metal layer and removal of the phosphor screen are effectively prevented.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A field emission display, comprising:
a first substrate and a second substrate opposing one another with a gap therebetween, the first substrate and the second substrate being sealed using a sealant wherein a vacuum assembly is formed between the first substrate and the second substrate in a region encompassed by the sealant;
an electron emission assembly located on the first substrate for emitting electrons by generation of electric fields within the electron emission assembly; and
an illumination assembly located on the second substrate for realizing a display of images by electrons emitted from the electron emission assembly,
wherein the illumination assembly includes (a) a transparent conductive layer located on a surface of the second substrate, the transparent conductive layer having a portion extending beyond the sealant as an anode input terminal to which an anode voltage is applied, (b) a phosphor screen located on the transparent conductive layer, and (c) a metal layer located on the phosphor screen within the vacuum assembly, a portion of the metal layer contacting and electrically connected to the transparent conductive layer.

2. The field emission display of claim 1, wherein the transparent conductive layer and the anode input terminal are integrally formed.

3. The field emission display of claim 2, wherein the transparent conductive layer and the anode input terminal are made of films of indium tin oxide.

4. The field emission display of claim 1, wherein the metal layer is formed over the phosphor screen having an area larger than the phosphor screen such that edges of the metal layer contact the transparent conductive layer.

5. The field emission display of claim 1,
wherein the electron emission assembly includes electron emission sources and electrodes for inducing the emission of electrons from the electron emission sources, and
wherein the electrodes include cathode electrodes and gate electrodes insulated from each other by an insulation layer and formed in respective stripe patterns, the cathode electrodes being substantially perpendicular to the gate electrodes.

6. The field emission display of claim 5, wherein the electron emission sources are made of a carbon-based material selected from a group consisting of carbon nanotubes, graphite, diamond, diamond-like carbon, $C_{60}$ (Fullerene), or a combination of these materials.

7. The field emission display of claim 5, further comprising the gate electrodes being formed on the first substrate, the insulation layer being formed on the first substrate covering the gate electrodes, the cathode electrodes being formed on the insulation layer, and the electron emission sources being formed on the cathode electrodes.

8. The field emission display of claim 5, further comprising the cathode electrodes being formed on the first substrate, the insulation layer being formed on the first substrate covering the cathode electrodes, the gate electrodes being formed on the insulation layer, the insulation layer and the gate electrodes including openings for exposing the cathode electrodes, and the electron emission sources being formed in the openings on the exposed cathode electrodes.

9. A field emission display, comprising:
a first substrate and a second substrate opposing one another with a gap therebetween, the first substrate and the second substrate being sealed using a sealant wherein a vacuum assembly is formed between the first substrate and the second substrate in a region encompassed by the sealant;
an electron emission assembly located on the first substrate for emitting electrons by generation of electric fields within the electron emission assembly; and
an illumination assembly located on the second substrate for realizing a display of images by electrons emitted from the electron emission assembly,
wherein the illumination assembly includes (a) a conductive layer located on a surface of the second substrate, the conductive layer having a portion extending beyond the sealant as an anode input terminal to which an anode voltage is applied, (b) a phosphor screen located adjacent the conductive layer, and (c) a metal layer located on the phosphor screen within the vacuum assembly, a portion of the metal layer contacting and electrically connected to the conductive layer,
wherein an end of the anode input terminal within the vacuum assembly contacts both the phosphor screen and the metal layer,
wherein the anode input terminal comprises a transparent conductive material.

10. The field emission display of claim 9, wherein the anode input terminal is an indium tin oxide film.

11. The field emission display of claim 9, wherein the metal layer covers entirely the phosphor screen and a portion of the anode input terminal.

12. The field emission display of claim 9,
wherein the electron emission assembly includes electron emission sources and electrodes for inducing emission of electrons from the electron emission sources, and
wherein the electrodes include cathode electrodes and gate electrodes, the cathode electrodes and the gate electrodes being insulated from each other by an insulation layer and formed respectively in a stripe pattern, the cathode electrodes being substantially perpendicular to the gate electrodes.

13. The field emission display of claim 12, wherein the electron emission sources are made of a carbon-based material selected from a group consisting of carbon nanotubes, graphite, diamond, diamond-like carbon, $C_{60}$ (Fullerene), or a combination of these materials.

14. The field emission display of claim 12, further comprising the gate electrodes being formed on the first substrate, the insulation layer being formed on the first substrate covering the gate electrodes, the cathode electrodes being formed on the insulation layer, and the electron emission sources being formed on the cathode electrodes.

15. The field emission display of claim 12, further comprising the cathode electrodes being formed on the first substrate, the insulation layer being formed on the first substrate covering the cathode electrodes, the gate electrodes being formed on the insulation layer, the insulation layer and the gate electrodes including openings for exposing the cathode electrodes, and the electron emission sources being formed in the openings on the exposed cathode electrodes.

16. A flat panel display, comprising:
a faceplate having a faceplate interior side;
a backplate having a backplate interior side in an opposing relationship to the faceplate interior side;

sidewalls positioned between the faceplate and the backplate to form an enclosed vacuum envelope between the sidewalls, the backplate interior side and the faceplate interior side;

a phosphor layer positioned on the faceplate interior side;

a transparent conductive layer located between the faceplate and the phosphor layer;

a metal layer positioned on the phosphor layer, wherein the metal layer is located entirely within the vacuum envelope, and wherein the transparent conductive layer includes an anode input terminal extending from within the vacuum envelope to outside the sidewalls.

17. The flat panel display of claim 16, wherein the metal layer has a larger area than the phosphor layer.

18. The flat panel display of claim 16, wherein the metal layer contacts the anode input terminal within the vacuum envelope and an anode voltage is applied to the anode input terminal outside the sidewalls.

19. An illumination assembly for a field emission display realizing a display of images by electrons emitted from an electron emission assembly within a vacuum assembly between substrates sealed by a sealant, comprising:

a substrate;

a transparent conductive layer located on a surface of the substrate, the transparent conductive layer having a portion extending beyond the sealant and having an anode input terminal as a portion of the transparent conductive layer extending beyond the sealant to which an anode voltage is applied;

a phosphor screen located on the transparent conductive layer; and a metal layer located on the phosphor screen, and having a portion of the metal layer for contacting and electrically connecting to the transparent conductive layer within the vacuum assembly.

20. The illumination assembly of claim 19, wherein the transparent conductive layer and the anode input terminal are integrally formed.

21. The illumination assembly of claim 19, wherein the metal layer is formed over the phosphor screen having an area larger than the phosphor screen such that edges of the metal layer contact the transparent conductive layer.

* * * * *

UNITED STATES PATENT AND TRADEMARK OFFICE
CERTIFICATE OF CORRECTION

PATENT NO.         : 7,382,089 B2
APPLICATION NO. : 10/731385
DATED                 : June 3, 2008
INVENTOR(S)       : Tae-Sik Oh

Page 1 of 1

It is certified that error appears in the above-identified patent and that said Letters Patent is hereby corrected as shown below:

| | |
|---|---|
| Column 8, line 23, Claim 9 | Delete "an", Insert --the-- |
| Column 8, line 25, Claim 9 | After "layer,", Insert --and-- |

Signed and Sealed this

Ninth Day of June, 2009

JOHN DOLL
*Acting Director of the United States Patent and Trademark Office*